United States Patent [19]

Faria

[11] 4,059,799
[45] Nov. 22, 1977

[54] TACHOMETER APPARATUS

[76] Inventor: Thomas G. Faria, 17 Park Drive, Waterford, Conn. 06385

[21] Appl. No.: 693,535

[22] Filed: June 7, 1976

[51] Int. Cl.$^2$ .............................................. G01P 3/48
[52] U.S. Cl. ................................ 324/169; 324/16 R; 324/115
[58] Field of Search ................ 324/169, 166, 78 J, 324/78 R, 115, 16 R; 321/9 R, 10

[56] References Cited

U.S. PATENT DOCUMENTS

| | | | |
|---|---|---|---|
| 2,948,853 | 8/1960 | Nylander | 324/115 |
| 3,329,892 | 7/1967 | Arrison | 324/169 |
| 3,657,649 | 4/1972 | Odorici | 324/115 |
| 3,829,774 | 8/1974 | Cerveny | 324/115 |
| 3,866,113 | 2/1975 | Schwartz | 324/169 X |

*Primary Examiner*—Rudolph V. Rolinec
*Assistant Examiner*—Vincent J. Sunderdick
*Attorney, Agent, or Firm*—Hopgood, Calimafde, Kalil, Blaustein & Lieberman

[57] ABSTRACT

The invention contemplates tachometer apparatus which functions from an electric pulse input which is of frequency directly related to engine speed of an internal combustion engine. In application to a modern automobile assembly line wherein successively assembled vehicles may have various-sized engines in random succession, the particular feature of the invention is that with essentially the same rectifier circuit and associated indicating meter, and with the simplest of manipulation or connection of a single element, the meter can be direct-reading and fully calibrated whether the invention is applied to a four-cylinder engine, to an eight-cylinder engine or to a six-cylinder engine.

18 Claims, 6 Drawing Figures

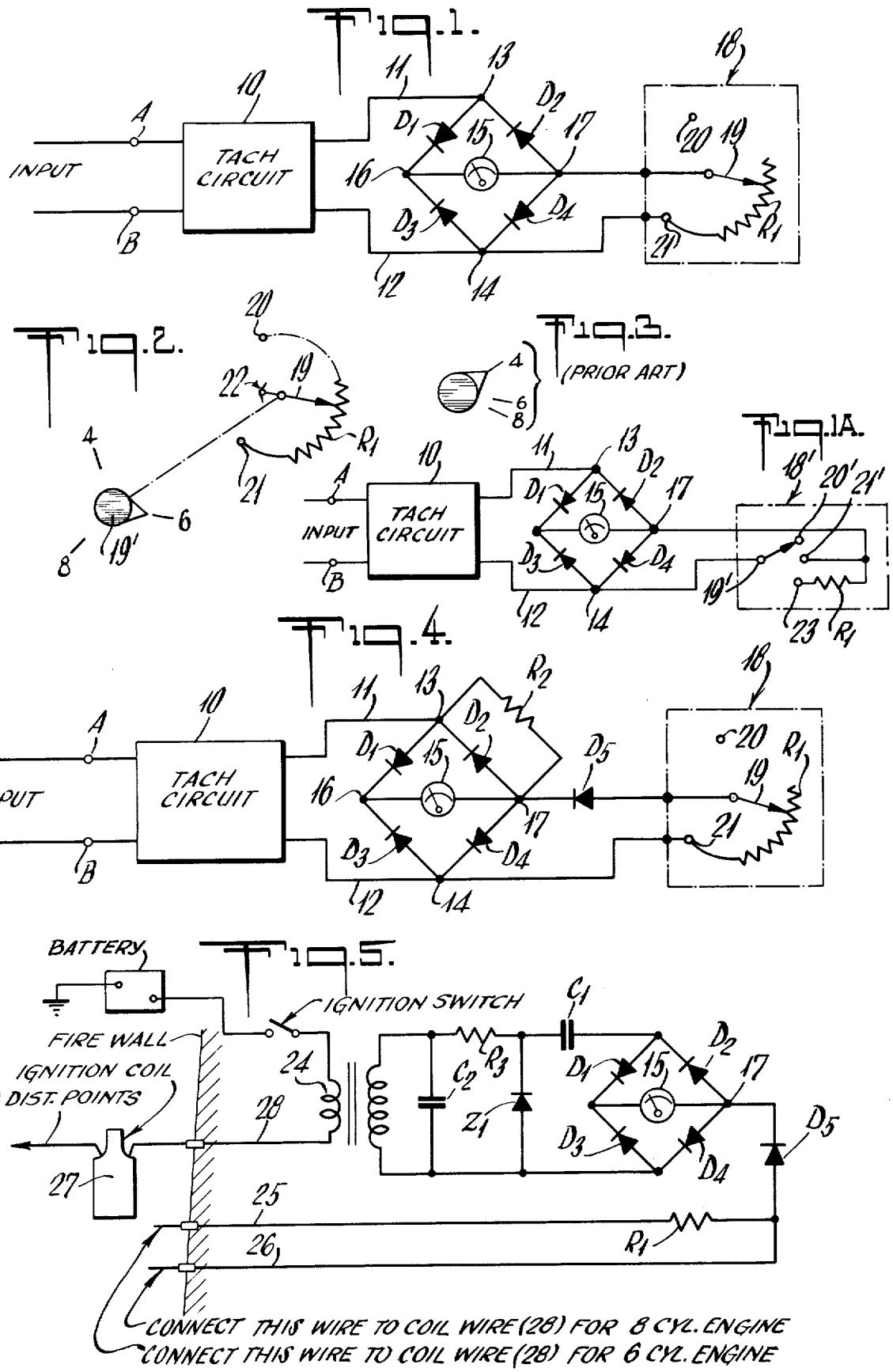

TACHOMETER APPARATUS

The invention relates to electric tachometers, that is, to tachometers which produce an engine-speed indication from an electric-pulse input, derived from the spark or distributor circuitry of the engine.

Most electric tachometers for internal-combustion engines, including tachometers of my U.S. Pat. No. 3,005,155, employ a rectifier circuit for converting a pulsed alternating current to direct current, in order to operate a sensitive DC milliammeter that indicates engine RPM. The rectifier may be of either half-wave or full-wave variety, and calibration generally involves a variable resistor connected across the milliammeter.

Since there is a demand for a tachometer that can as the same single unit be selectively operated in conjunction with 4, 6 or 8-cylinder gasoline-operated engines, some tachometer manufacturers incorporate three variable resistors in separate parallel lines to a selector switch, whereby a correctly calibrated resistance is selectively available for each of the three possible engine styles which the device may be called upon to accept. While this technique can be accurate, it is nonetheless somewhat expensive, because it is wasteful of components.

One of the solutions to this expense problem, is to eliminate the switch (described in the previous paragraph) and to provide separate flexible, suitably coded conductor leads to the vehicle firewall and connected to two of the three variable resistors. By suitable selection and calibration of the resistor values and by having the third resistor permanently connected for meter indication of engine RPM for a 4-cylinder engine, then correct meter readings can be selectively available for 6-cylinder or for 8-cylinder application, depending upon which of the two coded leads is permanently connected across the third resistor. Thus, without using either of the two coded leads, the instrument is a four-cylinder tachometer, there being no engine wiring-harness connection to the free ends of these two leads; but for either 6-cylinder or 8-cylinder application of the same instrument, the correct one of the two lead ends would be connected in circuit, as via the 6-cylinder wiring harness or the 8-cylinder wiring harness. Such a tachometer permits stocking of one tachometer, and errors are eliminated by relying upon engine wiring-harness construction to do the tachometer-resistance selection. But this is still a relatively expensive technique; and the actual number of wires going to the engine is three (for parallel-connected tachometers), since one wire is required for the single input to the tachometer.

Other manufacturers, particularly those who sell through stores to the general public, use just one variable resistor equipped with a pointer knob which the buyer must adjust or set to the proper setting for the number of cylinders on his engine. The manufacturer marks the positions that the variable resistor must be adjusted to, for either 4, 6 or 8-cylinder operation. While this method is economical, the adjustment required on a variable resistor of high enough resistance to cover the whole range of cylinders is too critical to enable accurate setting by the user. The error, particularly on 6 and 8-cylinder engines, can be very large because the knob adjustment has too short a range and cannot be adjusted with the necessary precision.

Automobile manufacturers have problems stocking three different 4-cylinder, 6-cylinder and 8-cylinder tachometers for production of vehicles with the three engines intermixed on the production line. Not only is there the extra expense of carrying three different tachometers in stock (instead of one) but occasionally the wrong tachometer gets installed for a particular vehicle engine.

Accordingly, it is an object to provide an improved electric tachometer construction of the character indicated.

It is another object to meet the above object with a tachometer construction wherein a selected one of a plurality of internal-combustion engine configurations is correctly served, in spite of the different number of cylinders of the respective configurations.

It is a specific object to meet the above objects with a single structure having selective adaptability to 4, 6, or 8-cylinder operation.

Another specific object is to achieve the foregoing objects, using no more than three wires from the instrument to the engine.

It is a general object to achieve the foregoing (a) with a minimum of parts, (b) without requiring added electrical connections, (c) with assurance of correct calibration whatever the engine configuration, and (d) at a cost saving, compared to any other structure known to me.

Other objects and various further features of novelty and invention will be pointed out or will occur to those skilled in the art from a reading of the following specification, in conjunction with the accompanying drawings. In said drawings which show, for illustrative purposes only, preferred forms of the invention:

FIG. 1 is an electrical circuit diagram illustrating a first form of the invention, in application to the ignition circuit of an internal-combustion engine; and FIG. 1A is similar, to show a modification;

FIG. 2 is a simplified view to illustrate control-actuator means for the circuit of FIG. 1;

FIG. 3 is a view similar to and for the purpose of comparision with FIG. 2, but illustrating a prior-art control-actuator means for a prior-art circuit (not shown);

FIG. 4 is a circuit diagram similar to FIG. 1 to show a modification; and

FIG. 5 is a circuit diagram to show another embodiment.

Referring to FIG. 1, the invention is shown as basically a tachometer instrument calibrated to serve a four-cylinder engine, and operating from a two-wire input A-B whereby the instrument can be effectively placed in series with the ignition circuit (i.e., ignition switch, coil and distributor points) of an internal-combustion engine. The input A-B is applied to suitable signal-processing circuitry 10 (labeled TACH CIRCUIT) whereby an output signal in conductors 11-12 is characterized by a succession of pulses of alternating polarity and uniform voltage and shape, but whose frequency bears a direct relation to engine RPM. It will be understood that the circuitry 10 may include shunt means, transformer means, or the like whereby series or shunt connection of input A-B to the engine-ignition circuit may have no deleterious effect upon ignition-circuit effectiveness, various illustrative connections and arrangements being shown in my said patent.

According to the invention, the shaped uniform-pulse output at 11-12 is applied to a first pair of opposed corners 13-14 of a full-wave rectifier bridge, comprising diode elements $D_1-D_2-D_3-D_4$ in the respective bridge arms, and with a milliammeter 15 connected between the remaining opposed corners 16–17. As thus-far described and connected, and with the indicator scale of meter 15 calibrated to read RPM for a four-cylinder engine, the instrument is complete and ready for a four-cylinder installation.

To provide for selective installation of the described FIG. 1 instrument in an eight-cylinder engine, all that is needed is to short-out one half of the rectifying function of the described bridge, thereby enabling meter 15 to respond to only half the number of pulses per engine revolution. And to provide for selective installation of the same instrument in a six-cylinder engine, all that is needed is the shunting of one arm of the bridge with a suitable resistance.

All three of the desired modes of connection are shown in FIG. 1 to be provided by a single commerically available circuit component 18, comprising a variable resistor $R_1$ having a movable contact arm 19 which is displaceable between extreme positions denoted by contacts 20–21; preferably, the motion is rotary, as through a 240° sweep between positions of arm contact at the limits 20–21. One end of resistor $R_1$ is connected to contact 21, and the other end of resistor $R_1$ is not connected to anything, being spaced from but near contact 20. Conductors connect arm 19 and contact 21 to bridge corners 17–14.

The described multipurpose tachometer will be seen to serve four-cylinder engines when arm 19 is switched to contact 20, thereby allowing full-wave rectification of the TACH CIRCUIT output. An eight-cylinder engine is served when arm 19 is switched to contact 21, thereby shorting arm $D_4$ and reducing meter response at 15 to half-wave rectification. And a six-cylinder engine is served when arm 19 is properly positioned to utilize the correct ohmic resistance of a major fraction of resistance $R_1$. Calibration of meter 15 can be correct whether made for the 4 or 8-cylinder selection positions of arm 19, and the angular position for which the 6-cylinder selection is correct can be made to occur generally in the mid range of the sweep of arm 19. With proper choice of the maximum ohmic value of $R_1$, the adjustment range for six-cylinder use can be relatively large, thus enabling use of a detent to retain selection of the six-cylinder position with accurate reference to the four or eight-cylinder calibration. In other words, the availability of a large range of movement for arm 19 enables its accurate and non-critical placement for the six-cylinder selection.

FIG. 1A will be recognized as being in all respects similar to FIG. 1, except for the substitution of a rotary-switch component 18' for the potentiometer component 18 of FIG. 1. Component 18' is shown to have three position contacts 20'–21'–23 for the selectively movable arm 19'. Selected positioning of arm 19' to the contacts 20'–21', respectively, results in the open-circuit and shorted conditions described for connections 20–21 in FIG. 1. And in the contact-23 position of FIG. 1A, a resistor $R_1$ of appropriate predetermined value is shunted across arm $D_4$, the ohmic value of $R_1$ being such as to determine a 6-cylinder engine compatability.

FIG. 2 is a simplified showing of the selector knob 19' for arm 19, and the displayed numbers 4–6–8 at approximately 120° spacings will be understood to provide simple external display of the currently selected angular position of knob 19', with detent-retention of the particular selected angle. Such retention of the six-cylinder selection is suggested at 22.

It will be appreciated that in the circuit of FIG. 1, i.e., for the 4-cylinder and 8-cylinder operations to be correctly calibrated in reference to each other (on a sufficiently accurate 2:1 relationship which depends solely on the difference between meter response to full us. half-wave rectification), the elements $D_1-D_2$ in the conjugate pair of arms not involved in short-circuiting by arm 19 may be matched silicon, germanium or other type rectifiers. However, in the other conjugate pair of arms, the elements $D_3-D_4$ should be of a variety such as germanium diodes, having substantially zero forward breakdown voltage.

FIG. 4 will be recognized for its similarity to FIG. 1, but it illustrates that the invention is not necessarily limited to use of rectifier elements having substantially zero forward breakdown voltage. Thus, in FIG. 4 the diodes $D_3-D_4$ may be rectifiers such as silicon diodes having a characteristic forward breakdown voltage; for example, silicon diodes normally require a voltage of about 0.6 volt in the forward direction before they will conduct. To offset this effect and thus to keep the desired 2:1 meter-indicated relationship as between the four and eight-cylinder modes, another diode $D_5$ is placed in series with the switch arm 19. Diodes $D_3-D_4-D_5$ should all have substantially the same forward breakdown characteristic, as will be understood.

In practice, a one percent error in calibration is considered tolerable and is the likely result of the circuit of FIG. 1 (substantially zero forward breakdown voltage at $D_3-D_4$) and of FIG. 4 as thus-far described with the offsetting or compensating diode $D_5$, the error being understood to be the extent to which an exact 2:1 relationship may not be maintained for meter indications in the eight-cylinder mode as compared with those for the four-cylinder mode. But if greater switching accuracy is desired, a resistor $R_2$ may be added in shunt across arm $D_2$, thus reducing any indicated difference or error between four and eight-cylinder meter indications.

FIG. 5 illustrates a series-connected embodiment of the invention wherein the switch 19 is eliminated. The rectifier bridge and its indicating meter are as already described and are shown to be driven by a transformer-operated tachometer circuit wherein the transformer primary 24 is in series with the ignition switch and its connection (through the vehicle fire wall) to the ignition coil. The tachometer circuit relies upon a Zener diode $Z_1$ and resistor-capacitance network elements $R_3-C_1-C_2$ for pulse processing and, as thus far described is preferably calibrated for application to a four-cylinder engine. For 6-cylinder and 8-cylinder application, two additional leads 25–26 are provided via a diode $D_5$ connection to the bridge terminal 17; lead 25 includes resistor $R_1$ selected for meter indication of the six-cylinder engine mode, and lead 26 provides the effective short-circuiting connection to achieve meter response to half-wave rectification. Reliance is placed upon six-cylinder wiring-harness construction and upon eight-cylinder wiring-harness construction to establish correct connection of lead 25 or lead 26 (as the case may be) to the ignition terminal 28 or to an analogous part of a solid-state ignition control, depending upon the nature of the ignition circuit of the particular vehicle. Were it not for diode $D_5$, current flowing to the ignition system would be the source of substantial error voltages impressed upon the tachometer circuit, but the blocking diode $D_5$ is found to substantially eliminate such errors.

The described circuits will be seen to meet all stated objectives and to provide with a basically simple single structure an accuracy of RPM readings that acceptably serves the particular engine style to which it is applied.

While the invention has been described in detail for the preferred forms shown, it will be understood that modifications may be made within the scope of the invention. For example, the principles of the invention are applicable to other combinations of cylinders, including five-cylinder engines, it being understood that the single switched shunt resistor $R_1$ is selected for ohmic value appropriate to the correct meter display for the selected number of cylinders between the 2:1 related numbers of cylinders.

What is claimed is:

1. Electric tachometer instrumentation having selective adaptability to each of a plurality of engine configurations having different numbers of cylinders and adapted to function in response to a pulsating input signal characterized by pulses of alternating polarity and for which the pulsating frequency bears a direct relation to a speed to be measured, said instrumentation comprising a full-wave rectifier bridge having four arms serially connected at four corner terminals, a first pair of opposed terminals being adapted to receive said input signal, current-measuring means connected across the other pair of opposed terminals, and selectively operable means including on-off switch means connected in shunt across one of said arms; whereby in the OFF-selected position of said switch means, said measuring means will correctly produce an engine-speed measuring response for an engine of a first number of cylinders; and whereby in the ON-selected position of said switch means, said measuring means will again correctly produce an engine-speed measuring response for a similar engine having a greater number of cylinders.

2. Tachometer instrumentation according to claim 1, in which said measuring means includes an indicator calibrated to read engine speed for a four-cylinder engine when in the OFF-selected position of said switch means, said switch means having the capability of short-circuiting said one arm when in the ON-selected position, whereby said calibrated indicator is also correctly calibrated for an eight-cylinder engine when said switch means is in said short-circuiting condition.

3. Tachometer instrumentation according to claim 1, in which said switch means has the capability of short-circuiting said one arm when in the ON-selected position, and in which said measuring means includes an indicator calibrated to read engine speed for an eight-cylinder engine when said switch means is in said short-circuiting condition, whereby when in the OFF-selected position of said switch means, said calibrated indicator is also correctly calibrated for a four cylinder engine.

4. Tachometer instrumentation according to claim 2, in which said switch means includes an electrical resistance element, and in which said short-circuiting condition is selectively operative for one of two ON-positions of said switch means, said electrical resistance element being connected in shunt across said one arm when said switch means is in the other of said ON-positions, said resistance element being selected for such ohmic resistance as will establish correct calibration of said indicator for an engine having a number of cylinders between four and eight.

5. Tachometer instrumentation according to claim 4, in which said ohmic resistance is selected for calibrated indication of six-cylinder engine speed.

6. Tachometer instrumentation according to claim 5, in which said switch means includes a rotary actuator for selection of a desired one of the three switch positions, the rotary orientation of said actuator for any one of said switch positions being relatively widely spaced from the orientations for each of the other two switch positions.

7. Tachometer instrumentation according to claim 4, in which said resistance element is a variable resistance connected at one end to one end of said one bridge arm, and in which said switch means includes a wiper arm connected at one end to the other end of said bridge arm and slidable over a displacement range for which a portion only is in contact with said resistance element.

8. Tachometer instrumentation according to claim 1, in which the arms of each conjugate pair of said bridge contain similar rectifier elements respectively connected for opposite conducting directions.

9. Tachometer instrumentation according to claim 8, in which the rectifier elements of the conjugate pair which includes said one arm are characterized by substantially zero forward breakdown voltage.

10. Tachometer instrumentation according to claim 9, in which the rectifier elements of the conjugate pair which includes said one arm are germanium diodes.

11. Tachometer instrumentation according to claim 8, in which the rectifier elements of the conjugate pair which includes said one arm are characterized by more than substantially zero forward breakdown voltage, and means including a diode serially connected across said one arm in the ON-selected position of said switch means for assuring a 2:1 relationship between current measurement characteristics for the respective ON-OFF positions of said switch means.

12. Tachometer instrumentation according to claim 1, in which said one arm is one element of one conjugate pair, and in which a calibrating resistor is connected in shunt across one of the remaining arms of said bridge, the ohmic value of said resistor being selected to assure a 2:1 relationship between current measurement characteristics for the respective ON-OFF positions of said switch means.

13. Electric tachometer instrumentation having selective adaptability to each of a plurality of engine configurations having different numbers of cylinders and adapted to function in response to a pulsating input signal characterized by pulses of alternating polarity and for which the pulsating frequency bears a direct relationship to a speed to be measured, said instrumentation comprising a full-wave rectifier having four arms serially connected at four corner terminals, a first pair of opposed terminals being adapted to receive said input signal, current-measuring means connected across the other pair of said opposed terminals, whereby said measuring means may correctly produce an engine-speed measuring response for an engine of a first number of cylinders, and selectively manipulable means including an electrical conductor connected at one end to one terminal of the other pair, whereby upon selective connection of the other end of said conductor in effective shunt of half of said rectifier, said measuring means may correctly produce an engine-speed measuring response for a similar engine having a greater number of cylinders.

14. Tachometer instrumentation according to claim 13, in which said manipulable means includes an externally accessible insulated flexible wire.

15. Tachometer instrumentation according to claim 13, in which said manipulable means includes an externally accessible insulated flexible wire with a series resistance connecting the same to said one terminal of said other pair, said series resistance being of ohmic value selected to achieve correct calibration of said measuring means for the rectifier-shunting condition in the case of a similar engine having cylinders numbering less than twice said first number of cylinders.

16. Tachometer instrumentation according to claim 5, in which said resistance element is a fixed resistance connected at one end to one end of said bridge arm, and in which said switch means includes a movable element connected to the other end of said bridge arm and being selectably movable to one of three positions, said movable element being electrically connected to the other end of said fixed resistance in one of said positions, said movable element being electrically connected to said one end of said bridge arm in a second of said positions, and said movable element being electrically disconnected from either direct or fixed-resistance connection to said one end of said bridge arm when in the third of said positions.

17. Tachometer instrumentation according to claim 2, in which said switch means is a rotary switch having a movable contact arm and two spaced contact positions, an electrical resistance element selected for such ohmic resistance as will establish correct calibration of said indicator for an engine having a number of cylinders between four and eight, said short-circuiting condition is selectively operative for one of said positions of said switch means, said electrical resistance element being connected in shunt across said one arm when said switch means is in the other of said positions, and said movable contact arm being movable to an open-circuit position removed from said contact positions.

18. Tachometer instrumentation according to claim 17, in which said ohmic resistance is selected for calibrated indication of six-cylinder engine speed.

* * * * *